(12) United States Patent
Salsman et al.

(10) Patent No.: US 6,171,654 B1
(45) Date of Patent: Jan. 9, 2001

(54) METHOD FOR BONDING GLASS FIBERS WITH CROSS-LINKABLE POLYESTER RESINS

(75) Inventors: Robert Keith Salsman, Hoschton; Timothy Shouting Wang, Atlanta, both of GA (US)

(73) Assignee: Seydel Research, Inc., Atlanta, GA (US)

( * ) Notice: Under 35 U.S.C. 154(b), the term of this patent shall be extended for 0 days.

(21) Appl. No.: 09/379,908

(22) Filed: Aug. 24, 1999

Related U.S. Application Data

(63) Continuation of application No. 08/980,364, filed on Nov. 28, 1997, now abandoned.

(51) Int. Cl.[7] .............................. B05D 3/02; D02G 3/40; C08J 11/24; C08J 11/26; C08F 8/14
(52) U.S. Cl. .................. 427/389.8; 428/375; 521/48.5; 525/172; 525/174; 525/439; 525/444
(58) Field of Search .................. 427/389.8; 428/375; 525/439, 444, 172, 173, 174; 521/45.5

(56) References Cited

U.S. PATENT DOCUMENTS

| | | | |
|---|---|---|---|
| 3,843,751 | * 10/1974 | Reese et al. | 525/172 |
| 4,104,222 | * 8/1978 | Date et al. | 428/524 |
| 4,576,990 | * 3/1986 | Mazaki et al. | 525/444 |
| 4,977,191 | * 12/1990 | Salsman | 525/444 |
| 5,189,108 | * 2/1993 | Imai et al. | 525/285 |
| 5,252,615 | * 10/1993 | Rao et al. | 521/48.5 |

FOREIGN PATENT DOCUMENTS

| | | | |
|---|---|---|---|
| 1121791 | * 7/1968 | (GB) . | |
| 1471 | * 1/1970 | (JP) | 521/48.5 |
| 622824 | * 9/1978 | (SU) | 521/48.5 |
| 6731 | * 9/1978 | (JP) | 521/48.5 |

* cited by examiner

*Primary Examiner*—Donald R. Wilson
(74) *Attorney, Agent, or Firm*—Isaac Angres; Cort Flint

(57) ABSTRACT

Water-soluble or water-dispersible and curable polyester resins are suitable as binders in various applications, The resins are reaction products of polyterephthalate, polyols, polyacids, end acids and crosslinking agents. The waste terephthalates can be utilized when making the binders of the present invention. The preferred polyol is pentaerythritol. The resins can be used as binder for glass fiber insulation products.

5 Claims, No Drawings

METHOD FOR BONDING GLASS FIBERS WITH CROSS-LINKABLE POLYESTER RESINS

This application is a continuation of application Ser. No. 08/980,364 filed Nov. 28, 1997 which application is now: abandoned.

This invention relates to water-soluble or water-dispersible and curable polyester resins. The resins can be made from waste plastic materials which would otherwise be discarded in landfills or other solid waste deposit facilities.

The curable polyester resins can be used as curable binders for a number of applications, especially for binding glass fibers in the production of fiberglass insulation products.

BACKGROUND OF THE INVENTION

Glass fibers have long been noted for their insulating value. However, depending upon the end use of the insulation, there are certain disadvantages to be found in glass fiber insulation now in general use. It is well known that in fibrous insulation the respective fibers are bonded to one another by a suitable binder system which normally consists of a phenolic liquid resole resin or a conventional phenolic-formaldehyde resin in combination with various additives. The additives are used to improve either the process characteristics of the binder system or to improve the finished fiberglass product characteristics.

Processes for making mineral fiber thermal insulation are typically carried out according to one of a number of methods wherein the molten mineral material flowing from a melting furnace is divided into streams and attenuated into fibers. The attenuation is done by centrifuging and/or fluid jets to form discontinuous fibers of relatively small dimensions which are collected by randomly depositing on a moving foraminous conveyor belt. The fibers are collected in a felted haphazard manner to form a mat. The volume of fiber in the mat will be determined by the speed of fiber formation and the speed of the belt. In order to produce most thermal insulating products, the fibers must be bonded together in an integral structure. To achieve this binding, a curable binder material is added to the mineral wool. The curable binder composition is generally formulated as a liquid to be sprayed onto the fibers as they are dropping onto the collecting conveyor belt. The layer of fiber with binder is then compressed and shaped into the form and dimensions of the desired thermal insulating product and passed through a curing oven where the binder is cured fixing the size and shape of the finished insulating product. Various materials have been used as binder ingredients including both organic and inorganic materials generally blended for different properties. The organic binder material most commonly employed are heat curable thermosetting resin systems of the phenol-formaldehyde type.

Such binders are generally provided as water soluble or water dispersable compositions which can be easily blended with other ingredients and diluted to low concentrations which are readily sprayed onto the fiber as it falls onto the collecting conveyor. The binder composition is generally applied in an amount such that the cured binder constitutes about 5% to about 10% by wt. of the finished product though it can be as little as 1% or less or as high as 20% or more, depending upon the type of fiber product. Optimally, the amount of binder for most thermal insulating products will be the amount necessary to lock each fiber into the mass by bonding the fibers where they cross or overlap. For this reason, it is desired to have binder compositions with good flow characteristics so that the binder solution can be applied to the fiber at a low volume that will flow to the fiber intersections.

Generally, the binder system requirements are for a low cost water soluble or water dispersable composition which can be easily applied and readily cured during normal production cycles. The product should be relatively stable for periods of time long enough to permit mixing and application at temperatures ordinarily encountered in fiberizing plants and the composition should be dilutable in order to permit variations in concentrations for different end products. The cured binder product must provide a strong bond with sufficient elasticity and thickness recovery to permit reasonable shipping and in-service deformation of the thermal insulating product. It must be moisture resistant so that it will not swell under humid conditions. It must be odor free and non-corrosive to metals with which it comes in contact. The binder should be capable of withstanding temperatures as high as the temperature that the mineral fiber can withstand, particularly for pipe insulation where the pipeline is used for hot fluids. The mineral fibers can be any of the materials which are capable of being fiberized. Typical binder compositions for glass are prepared as aqueous solutions or dispersions of partially condensed phenolic formaldehyde resins to which are added a variety of modifiers or agents to improve the spraying, flowing or similar application characteristics as well as the bonding strength, temperature resistance and other in-service features of the cured resin.

DESCRIPTION OF THE PRIOR ART

Altenberg, in U.S. Pat. No. 4,604,410, has proposed making etherified aromatic polyols by digesting scrap polyalkylene terephthalate with a low molecular weight polyhydroxy compound, containing 3–8 hydroxyl groups. A resulting intermediate is alkoxylated with 1–4 moles of ethylene oxide and/or propylene oxide. The final product is useful in making polyurethane and polyisocyanurate foams.

Sperenza et al. (U.S. Pat. No. 4,485,196) have recited reacting recycled polyethylene terephthalate scrap with an alkylene oxide, such as propylene oxide. The product can be used in making rigid foams.

Other methods of reacting scrap polyalkylene terephthalate with glycols or polyols are proposed by Svoboda et al. (U.S. Pat. No. 4,048,104) and Altenberg et al. (U.S. Pat. No. 4,701,477). In our previous invention (U.S. Pat. No. 4,977,191 (Salsman)) we disclosed a water-soluble or water-dispersible polyester resin suitable for textile sizing applications. The polyester resin comprises a reaction product of 20–50% by weight of waste terephthalate polymer, 10–40% by weight of at least one glycol and 5–25% by weight of at least one oxyalkylated polyol. Preferred compositions also comprise 20–50% by weight of isophthalic acid. A further water-soluble or water-dispersible resin comprises a reaction product of 20–50% by weight of waste terephthalate polymer, 10–50% by weight of at least one glycol and 20–50% by weight of isophthalic acid.

U.S. Pat. No. 5,252,615 (Rao et al.) discloses coating compositions derived from alcoholysis of polyethylene terephthalate (PET). Most preferably, the PET is recycled or reclaimed from plastic articles.

Dale et al., in U.S. Pat. No. 4,104,222, have proposed making a dispersion of linear polyester resins by mixing linear polyester resin with a higher alcohol/ethylene oxide addition-type surface-active agent, melting the mixture and dispersing the resulting melt in an aqueous alkali solution. The products are used as coating and impregnating agents.

U.S. Pat. No. 4,542,068 (Whichard) is directed to a method of making glass fiber mat of improved tensile strength. The method comprises forming a wet mat of a plurality of enmeshed sized glass fibers in a wet-laid process and coating the fiber of the wet mat with a binder and drying the mat. The binder consists essentially of a urea-formaldehyde resin and alkoxylated alkyl amine surfactant.

The prior art is silent regarding the binders of the present invention as well as fiberglass insulation products containing such binders.

OBJECTS OF THE INVENTION

It is an object of the invention to produce a curable polyester resin.

It is another object of the invention to utilize waste material in the production of polyester resins.

It is still another object of the invention to use the cured polyester resin as a binder in various applications.

It is a further object of the invention to make rolls or sheets of fiberglass insulating material using the cured polyester.

Another object of the present invention is to provide fibrous insulation formed by glass fibers bonded together with a low cost, stable and zero emission binder system which is convenient to use, and satisfies the other product requirements of the insulation.

A further object of the present invention is to provide a cured binder product having a strong bond with sufficient elasticity and thickness recovery to permit reasonable shipping and in-service deformation of the thermal insulation product.

Another object of this invention is to provide a method which will effectively give an emissions free composite wood panel bonded by a curable polyester resin derived from recycled PET.

A further object of the invention are composite wood panels free of emissions bonded with a curable polyester resin with no effect on the physical strength of the panels.

It is yet another object of the present invention to provide a method of making emissions free particle board panels which are bonded with a curable polyester resin derived from recycled PET. These and many other objects will become readily apparent upon reading the following further description of the invention.

SUMMARY OF THE INVENTION

The present invention relates to novel water-soluble or water-dispersible and curable polyester resins and a method for making resins. The invention utilizes reclaimed poly-terephthalates such as PET.

On one aspect, this invention relates to a water-soluble or water-dispersible and curable polyester, comprising a reaction product of 5–50% by weight of polyols, 20–60% by weight of terephthalate polymer and a reactive diluent. The reactive diluent serves as crosslinking agent. The terephthalate polymer can be a virgin polymer or a waste terephthalate polymer.

In another aspect, this invention relates to a water-soluble or water-dispersible polyester resin comprising a reaction product of 5–50% by weight of pentaerythritol, 5–40% by weight of other polyol, 20–50% by weight of polyacid, and 5–40% by weight of the crosslinker. The most preferred polyacids but not limited to are isophthalic and terephthalic acids. The resin can be cross-linked with any known crosslinking agent including melamine resins, polyacids such as citric acid and polyacrylic acid, and epoxy compounds.

The invention is also directed to the use of the novel polyester resins as binders and to articles made with these binders.

The invention is yet directed to a method for forming glass fiber insulating products with high recovery rates suitable for storage under the high humidity and temperatures typical of warehousing prior to use.

The polyester resins of the present invention are also particularly useful as a thermoset binder for rubber, recycled rubber and other materials.

The polyester binders of the instant subject matter are also useful for making products from compressed wood and/or wood fibers. The binders are also useful in making sound insulation panels for the automotive industry.

The polyester binders of the present invention are also particularly advantageous for two reasons: (1) they are derived from recycled polyesters, and (2) the binders of the present invention do not emit any volatile organic compounds and accordingly are environmentally friendly when compared to the current systems that emit formaldehyde and phenol emissions. The thermosetting polyester binder of the present invention is emissions free.

The present invention also relates to method for bonding glass fibers which method comprises:

(a) forming a mat containing a plurality of enmeshed glass fibers;

(b) spraying said fibers with a binder comprising a reaction product of 5–50% by weight of a polyol, 20–60% by weight of terephthalate polymer, 1–15% by weight of an end acid, and 5–40% of a crosslinking agent;

(c) curing the resulting glass fiber product having the binder thereon.

The instant invention further relates to a method for bonding glass fibers which method comprises:

(a) forming a mat containing a plurality of enmeshed glass fibers;

(b) spraying said fibers with a binder comprising a reaction product of 20–60% by weight of pentaerythritol, 5–50% by weight of waste terephthalate polymer, 1–15% by weight of trimellitic anhydride, 5–40% by weight of melamine resin, and 0.01–2% by weight of p-toluene sulfonic acid;

(c) curing the resulting glass fiber product having the binder thereon.

The invention further relates to processes for making glass fiber mat having improved tensile strength properties comprising:

(a) forming a mat containing a plurality of enmeshed glass fibers;

(b) coating the fibers of said wet mat with a binder composition comprising a reaction product of 5–50% by weight of pentaerythritol, 5–40% by weight of and additional polyol, 20–50% by weight of a polyacid, 1–15% by weight of an end acid, 5–40% by weight of melamine resin, and 0.01–2% by weight of p-toluene sulfonic acid;

(c) curing the glass mat having the binder thereon.

DETAILED DESCRIPTION OF THE INVENTION

The objects of the present invention and many of the expected advantages of the present invention will be readily appreciated as the same becomes better understood by reference to the following detailed description.

The water-soluble or water-dispersible and crosslinkable polyester resins are first made from the terephthalate polymers (PET), including waste PET or polyacid and polyol to produce an intermediate polyester. Then, the intermediate polyester reacts with the end acid and after that the reaction product is crosslinked with crosslinking agents. The reaction processes are shown as follows:

HO(ROOC—R'—COO)$_n$H+(HO)$_m$C$_x$H$_{2mn+2}$→polyesterI    (1)

polyesterI+end acid→polyesterII    (2)

polyesterII+crosslinking agent→crosslinked polyester    (3)

wherein R is an optional group such as a residue of aliphatic or aromatic hydrocarbon, R' is a residue of aliphatic or aromatic hydrocarbon, n is a number from 1 to 10000, m and x are equal to 3–10, an end acid is ionizable polyacid.

The water-soluble or water-dispersible resins are made from waste terephthalate polymers, including bottles, sheet material, textile wastes and the like. The waste terephthalate plastics may be bought from recyclers and include, but are not limited to, material identified as "PET rock".

Preferably the waste terephthalate polymer is a polyalkylene terephthalates such as polyethylene terephthalate and polybutylene terephthalate, polycyclohexanedimethanol terephthalate or a mixture thereof.

It will be understood that, for reasons of economy, the use of waste terephthalates is preferred. However, the use of virgin terephthalate resins is to be included within the scope of the disclosure and appended claims.

The polyacid can be diacid or triacid, but preferred is diacids which are isophthalic acid, terephthalic acid, hexadiendionic acid, butane diacid.

The polyols can be selected from pentaerythritol, erythritol, sorbitol, mannitol, monosaccharoses such as fructose, trimethylolpropane, glycerol, and their mixtures. A corn syrup can be also used instead of polyols. The most preferred polyol is pentaerythritol.

The glycol with which the waste terephthalate polymer is reacted can be selected from a variety of known dihydric alcohol's. Preferred glycols include, but are not limited to, ethylene glycol, diethylene glycol, triethylene glycol, cyclohexanedimethanol, propylene glycol, butylene glycol, neopentyl glycol, 1,5-pentanediol, 1,6-hexanediol or mixtures thereof Most preferably, the glycol is a mixture of diethylene glycol and neopentyl glycol.

The end acid is trimellitic acid, maleic acid or one of their anhydrides. If maleic acid or its anhydride is used as end acid, a further sulfonation reaction process can be done as described in U.S. Pat. No. 5,281,630.

A number of known crosslinking agents can be utilized. The examples are melamine resins, polyacids, epoxy compounds, boric acid and borates, peroxides, polyglycidyl ethers. The melamine resins can be melamine, formaldehyde melamine, methylated formaldehyde-melamine, and butylated formaldehyde-melamine. The polyacids can be chosen from citric acid or polyacrylic acids. The epoxy compounds can be produced by reacting epichlorohydrin with ethylenediamine. The most preferred crosslinking agent is methylated formaldehyde-melamine. P-toluene sulfonic acid is used as catalyst for accelerating the curing reaction between the polyester obtained in this invention and a crosslinker. Other catalysts can also be used.

The water-soluble or water-dispersible and curable polyesters are prepared by mixing polyterephthalates, polyols or mixtures of polyols, and, optionally, a polyacid such as isophthalic acid, and acids such as trimellitic acid or maleic acid or their anhydrides in any order until a mixed terephthalate-polyacid ester has occurred. This process normally requires, for acceptable reaction times, temperatures of above about 150° C. to the decomposition point of the ester product.

The preferred method for making water-soluble or water-dispersible and curable polyesters comprises mixing PET, polyol, isophthalic acid, trimellitic acid or maleic anhydride and heating the mixture to a temperature above about 150° C. The polyethylene terephthalate is broken down first with polyol by depolymerization to some extent and, then, the thus-produced intermediate monomer or oligomer is polymerized with maleic anhydride or trimellitic anhydride in the presence or absence of isophthalic acid. The polyester resin is finally mixed with a melamine resin and a p-toluene sulfonic acid as a catalyst. The mixture is heated to a temperature up to about 250° C. A strong adhesion and modulus film is formed on a glass or plastic or metal plate. The crosslinked polyester is colorless, transparent. No stickiness is observed as no pigment is added.

The depolymerization of terephthalate polymer with polyol and the polymerization between the intermediate and acids can be catalyzed by an ester-transfer catalyst. Preferred catalysts include tetraalkyl titanates, in which the alkyl has up to 8 carbon atoms, as well as alkyl stannoic acid or dioctyl tin oxide. The preferred catalysts are monobutyl stannoic acid and tetrapropyl or tetrabutyl titanate, or a mixture thereof.

The resinous products obtained are generally taken up in relatively concentrated aqueous solutions of alkali metal or ammonium hydroxides or carbonates. The concentration employed can be determined by routine experimentation. However, if shipping of the concentrated aqueous solutions to a point of use is contemplated, it is preferred to produce highly concentrated solutions. It is within the scope of this invention to produce initial solutions or dispersions, containing 20–30% or more of resin solids. The products of the present invention find use as ink resin, textile sizing resins, paper sizing and coating resins, dispersible urethane resins and as fiberglass binders.

BEST MODE FOR CARRYING OUT THE INVENTION

A preferred product is a reaction product comprising 5–50% by weight of pentaerythritol, 20–60% by weight waste terephthalate polymer, 1–15% by weight trimellitic anhydride, 5–40% by weight of melamine resin, and 0.01–2% p-toluene sulfonic acid.

Another preferred manufacturing process comprises the reaction products of 5–50% by weight of pentaerythritol, 5–40% by weight of other polyol, 20–50% by weight of isophthalic acid, 1–15% by weight trimellitic anhydride, 5–40% by weight of melamine resin, and 0.01–2% by weight of p-toluene sulfonic acid.

Yet another preferred reaction product comprises 5–50% by weight of pentaerythritol, 5–40% by weight of other polyol, 20–50% by weight of terephthalic acid, 1–15% by weight maleic anhydride, 5–40% by weight of melamine resin, and 0.01–2% by weight of p-toluene sulfonic acid.

As trimellitic acid is used as the end acid and the polyester is dissolved into water, the basic water solution is used. The basic chemicals, such as alkali metal or ammonium hydroxide or carbonates, are preferred. The amount of the used base depends on the water solid content of the resin in water solution. The solid content can be 20–70%.

When a maleic anhydride is used as end acid, the resin is sulfonated with sodium sulfonate at about 30 to about 100° C. in water. The product is produced by reaction of 5–50% by weight of pentaerythritol, 20–60% by weight waste terephthalate polymer, 7–30% by weight of maleic anhydride, 1–15% by weight of sodium sulfite, 5–40% by weight of melamine resin, and 0.01–2% by weight of p-toluene sulfonic acid. The solid content of the resin solution can be 20–70% by weight. The resin solution can be very acidic. pH can be adjusted by alkali metal or ammonium hydroxide or carbonate.

Without further elaboration it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the following examples, the temperatures are set forth uncorrected in degrees Celsius. Unless otherwise indicated, all percentages are by weight.

Examples 1–3 disclose the preparation of water-soluble resin from scrap polyethylene terephthalate.

EXAMPLE 1

The following recipe is used:

| Ingredient | weight/ g |
| --- | --- |
| Waste polyethylene terephthalate | 203.09 |
| Pentaerythritol | 44.73 |
| Tetrapropyl titanate | 0.18 |
| Neopentyl glycol | 46.71 |
| Isophthalic acid | 91.35 |
| Trimellitic anhydride | 63.94 |
| Melamine resin | 112.5 |

Polyethylene terephthalate, pentaerythritol, neopentyl glycol are added into a 500 mL reactor which is equipped with thermometer, blade stirrer, condenser, and nitrogen inlet tube. The reactor is heated to 180–280° C. smoothly. For 1–3 hours at this temperature, all solids is are dissolved and a low viscosity intermediate products are obtained. Then, isophthalic acid is added and reaction is conducted at similar temperature. The reaction is monitored by viscosity and acid volume analysis. As the acid volume is below 20, trimellitic anhydride is added to allow the reaction to continue for 1–3 hours. A colorless and transparent polyester is obtained. The polyester is dissolved in an ammonium hydroxide solution. The resin solution is finally mixed with melamine resin. 1–2 g final resin solution is spread on a metal or glass plate and heated at 150° C. for 5–60 minutes. A crosslinked, colorless and transparent film is formed.

EXAMPLE 2

The following recipe is used:

| Ingredient | weight/g |
| --- | --- |
| Waste polyethylene terephthalate | 230.4 |
| Pentaerythritol | 217.84 |
| Trimellitic anhydride | 115.28 |
| Tetrapropyl titanate | 0.18 |
| Melamine resin | 148.34 |
| p-toluene sulfonic acid | 2.25 |

The reaction is similar with Example 1. A strong modulus film is obtained.

EXAMPLE 3

The following recipe is used:

| Ingredient | weight/g |
| --- | --- |
| Waste polyethylene terephthalate | 135 |
| Pentaerythritol | 10.00 |
| Tetrapropyl titanate | 0.50 |
| Neopentyl glycol | 37.36 |
| Diethylene glycol | 38.07 |
| Maleic anhydride | 84.74 |
| Monobutyl stannoic acid | 0.40 |
| Melamine | 76.42 |
| p-toluene sulfonic acid | 1.22 |

Following the reaction procedure in Example 1, a good polyester is obtained.

EXAMPLE 4

100 g 50% polyester synthesized as described before was mixed with 1 to 50 g citric acid and 1 to 5 g p-toluenesulfonic acid. The mixture was heated from 110 to 250° C. A highly-crosslinked high-modulus polymer was formed.

EXAMPLE 5

100 g 50% polyester was mixed with 1–100 g polyacrylic acid or copolymer of acrylic acid and 1 to 5 g p-toluenesulfonic acid. The mixture was heated from 110 to 250° C. A high modulus polymer was formed.

In the below examples 6,7,8 PET is replaced by isophthalic or terephthalic acids.

EXAMPLE 6

The following recipe is used:

| Ingredient | weight/g |
| --- | --- |
| Isophthalic acid | 166.13 |
| Ethylene glycol | 52.08 |
| Pentaerythritol | 102.11 |
| Monobutyl stannoic acid | 0.30 |
| Maleic anhydride | 35.59 |

The reaction is similar with the procedure described before. A colorless transparent polyester was synthesized. It can be crosslinked with a crosslinking agent such as melamine resin, polyacid, and epoxy compounds.

EXAMPLE 7

The following recipe is used:

| Ingredient | weight/g |
| --- | --- |
| Isophthalic acid | 166.13 |
| Neopentyl glycol | 52.08 |
| Pentaerythritol | 102.11 |
| Monobutyl stannoic acid | 0.30 |
| Maleic anhydride | 35.59 |

The reaction is similar with the procedure described before. A colorless transparent polyester was synthesized.

EXAMPLE 8

The following recipe is used:

| Ingredient | weight/g |
|---|---|
| Terephthalic acid | 166.13 |
| Ethylene glycol | 52.08 |
| Pentaerythritol | 102.11 |
| Monobutyl stannoic acid | 0.30 |
| Maleic anhydride | 35.59 |

The reaction is similar with the procedure described before. A colorless transparent polyester was synthesized.

The polyesters obtained in Examples 6–8 are crosslinked with crosslinking agents selected from the group consisting of melamine resin, polyacid, epoxy compounds or other crosslinkers. The water soluble or water dispersible and curable resins can be used as thermosetting binders for multiple purposes. One of the applications is to use the water-soluble or water-dispersible and curable polyester resins for making fiber glass insulation and fiber glass mats.

As shown above, it is possible to provide a binder composition which can be formulated continuously or if batchwise then batches of consistent quality can be produced by monitoring the characteristics of the cured binder and altering the composition to provide consistent performance characteristics such as temperature resistance, bonding strength, sprayablility and the like. To this end, the present invention sets forth several specific formulations for new binder compositions and further it teaches a method of preparing binder compositions invention sets forth several specific formulations for new binder compositions and further it teaches a method of preparing binder compositions and thermal insulation products in which the ingredients are combined in accordance with stoichiometric proportions determined by the nature of the starting materials. Stoichiometric control is achieved through titration to determine the necessary quantities and by thermal analysis of the end product. The novel binder compositions can be employed in thermal insulation manufacturing operations currently in use commercially, to is provide a product with consistent high temperature resistance, good sprayability and flow characteristics and high bonding strength and which will cure under process conditions generally in use in the production of glass fiber thermal insulation.

In a typical embodiment for making glass fiber insulation the following procedure is carried out. The glass is melted and run into a rapidly spinning disk where filaments are thrown out of a spinneret with centrifugal force. At this point the binder is sprayed on at a concentration of 13% solids. The vaporization of the water cools the glass down and it falls unto a chain-type belt where it is accumulated with glass from other belts. Once accumulated, the glass travels through an oven where the resin binder is thermoset. The glass emerging from the oven is cut into the size that can be placed in a stud wall and several pieces are packaged by combining in a bundle, compressing the bundle, and wrapping it. The binder must be capable of allowing the glass mats to recover once they have been unwrapped. This curable binder of the present invention meets this need. When the glass fiber bundles of the present invention are stored in hot and humid warehouses, the product containing the inventive curable binder shows good recovery once they have been unwrapped. Typically, good recovery is necessary for good insulation value.

When making reinforcing mats, the resulting mats have high tensile strength properties. The glass fiber mats are formed from a plurality of sized fibers coated with the novel thermosetting binder and drying the coated fiber glass mat.

The process of forming glass fiber mats starts with preparing chopped bundles of sized glass fibers of suitable length and diameter. Each bundle contains from about 20 to about 300 or more chopped fibers. Fibers have the length of about 6 to about 75 millimeters and a diameter of about 3 to about 20 micrometers. Fibers may be wet or dry, as long as they can be suitably dispersed in an aqueous dispersant medium. The bundles are added to the dispersant medium to form an aqueous slurry. Any suitable dispersant known in the art may be used. The fiber slurry then is agitated to form a workable dispersion at a suitable consistency. The dispersion then is passed to the screen of a mat-forming machine. Enroute to the screen, the dispersion usually is diluted with water to a lower fiber concentration.

The fibers are collected at the wire screen in the form of a wet fiber mat and the excess water is removed by vacuum in the usual manner. The wet mat now is ready for application of the binder composition thereto. This is generally accomplished by soaking the mat in an excess of binder solution to insure complete coating of fibers and removing excess binder under vacuum. The mat then is dried and the binder composition is cured preferably in an oven at elevated temperatures of at least at about 200° C. Alternatively, but less desirable, catalytic curing may be used, such as with an acid catalyst, e.g., ammonium chloride or p-toluene sulfonic acid.

Composite woodboards are also contemplated by the present invention. The wood-based composite board having no emission are made by a process comprising:
 a. comminuting the wood into a particulate form;
 b. blending from 4.5 to 30% by weight of the wood particles on a solids basis of a liquid, aqueous adhesive binder resin of the present invention; and
 c. forming the particles into mats and hot pressing the mats and hot pressing the mats for a time and at a temperature sufficient to cure the resin binder.

EXAMPLE 9

Each mat was made by dispersing 7.2 g of 32 mm length OCF 670 M glass fibers in 12 liters of a 200 ppm solution of dimethylhydrogenated tallow amine oxide, at 0.06 wt % consistency. The dispersion was then diluted to 0.015% consistency enroute to a dewatering screen where a wet web was formed. The wet web then was dipped into an aqueous binder solution of a water-soluble or water dispersible and curable polyester binder (20% solids by weight). The binder can be the reaction product of 20–60% by weight of pentaerythritol, 5–50% by weight of waste terephthalate polymer, 1–15% by weight of trimellitic anhydride, 5–40% by weight of melamine resin, and 0.01–2% by weight of p-toluene acid. The binder can also be the reaction product of 5–50% by weight of pentaerythritol, 5–40% by weight of other polyol, 20–50% by weight of polyacid, 1–15% by weight of an end acid, 5–40% by weight of melamine resin, and 0.01–2% by weight of p-toluene sulfonic acid. Except for the control, the binder solution in each case typically contains surfactants of the type indicated below. Thereafter excess binder was removed by vacuum and the mat was dried. The basis weight of the mat was about 110 grams per square meter, the caliper was 1.0 mm and the binder constituted about 23% by weight of the mat.

Each glass mat was then tested for tensile strength under dry conditions (dry tensile) and after thorough soaking in water for 10 minutes at 25° C. The tensile strengths were measured using mat specimens 50×200 mm in the machine direction (MD). The results were recorded as newtons per 50 millimeters for the average of 5 samples.

The surfactants used are identified as follows:

1. Katapol R PN-430 surfactant supplied by GAF Corporation. This was ethoxylated tallow amine having the structure:

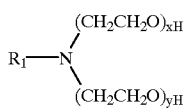

where x+y=5 and $R_1$ is a mixture of alkyl groups averaging about 18 carbon atoms.

2. Katapol R PN-730 surfactant supplied by GAF Corporation. This was also ethoxylated tallow amine of the same structure as Katapol R PN-430 except that x+y=15.

3. Katapol R PN-730 surfactant supplied by GAF Corporation. This was also ethoxylated tallow amine of the same structure as Katapol R PN-430 except that x+y=9.

The preceding examples can be repeated with similar success by substituting the generically or specifically described reactants and/or operating conditions of this invention for those used in the preceding examples.

EXAMPLE 10

The particleboard discussed in this example is manufactured by the following general procedure. Furnish is mixed, western softwoods, typically about 60+% ponderosa pine, 10% cull wood of various species, 10% plywood veneer trim, usually mixed Douglas fir and true firs and the balance being particleboard trim and other recycled material. The pine is supplied predominately as dry planer shavings and dry or partially dried sawdust. The raw finish materials are first screened and the fines used without further refining. Coarse shavings and cull wood are reduced in a hammermill or knife ring-type flaker while saw dust is reduced in a disc-type refiner.

The sawdust-derived furnish is ultimately dried in a steam heated dryer to 4.5–7% moisture. This material is typically used for surfacing. The coarser particles are dried to about 3.5–5% moisture in a direct fired dryer for use as finish for the core portion. Dried particles are then sent to storage bins until needed for use.

Various particle streams are drawn from the bins and passed over weight belts that control the ratios of furnish ingredients. When a fines surfaced or three-layer board is being made, the ground sawdust from the disc refiners is treated separately for use as the surface layers. Single layer or homogeneous boards are made using only material from the shavings refiners.

The mixed particle streams are directed to a preliminary blender where the salt mixture is added and uniformly distributed. From there, the particles flow to a paddle blender where the resin and any other ingredients such as wax are added. Resin is sprayed on the particles in the blender through a parallel set of spray nozzles. Normal usage is from 6–8% resin solids per 100 part by weight of dry wood particles. Normally, where a multilayered panel is being made, the surface layers will have slightly higher resin usage than will the core portion.

Wax may also be added to the furnish at the resin blender to achieve better water resistance. Normally about 0.28% wax will be added to the surface layers with about half of this amount being added to the core particles. The wax may be added as an emulsion, but it is preferred to use a steam atomized melted slack wax to reduce the amount of moisture being added to the furnish.

A typical particleboard resin will contain from 50 to about 65% solids content. Water may be added with the resin as needed to achieve ultimate moisture contents of about 10% for surface particles and 8½% for core particles.

Particles from the blenders flow to one of four forming heads. Two lay down the respective faces and the other two form the interior portion of the boards. The mats, now on metal cauls, are rough trimmed to size. Material removed from the edges and ends is directly recycled to the core formers. Trimmed mats are weighed and deviations from the desired norm are fed back to the formers where any necessary adjustments are made. Immediately before pressing, the mats are given a very light surface water spray. The present process employs a 14 opening press having the capability of making boards 1.52×7.32 meters (5×24 feet) in size. Mats on their cauls are charged into the press. Closing time when making 19 mm (¾ in.) board is about 60 seconds until fill pressure is reached. Press time is about 245 seconds at a temperature of about 169° C. (337° F.). After pressing, the pressure is slowly reduced during a 20 second decompression interval. The panels are run through a cooler, rough trimmed, and then stacked in readiness for final trimming, packaging and shipping.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method for bonding glass fibers which method comprises:
   (a) forming a mat containing a plurality of enmeshed glass fibers;
   (b) spraying said fibers with a cross-linkable binder comprising a reaction product of 5–50% by weight of pentaerythritol, 20–60% by weight of terephthalate polymer, and 1–15% by weight of trimellitic acid, mixed with 5–40% of a crosslinking agent; and
   (c) heat curing the resulting glass fiber product having the binder thereon.

2. A method for bonding glass fibers which method comprises:
   (a) forming a mat containing a plurality of enmeshed glass fibers;
   (b) spraying said fibers with a binder comprising a reaction product of 20–60% by weight of pentaerythritol, 5–50% by weight of waste terephthalate polymer, 1–15% by weight of trimellitic anhydride, mixed with 5–40% by weight of melamine resin and 0.01–2% by weight of p-toluene acid;
   (c) curing the resulting glass fiber product having the binder thereon.

3. A method for making glass fiber mat having improved tensile strength properties of claim 1 wherein the binder further comprises a surfactant.

4. The method of claim 1 wherein said terephthalate polymer is waste polyethylene terephthalate.

5. The method of claim 1 wherein said cross-linking agent is polyacrylic acid.

* * * * *